United States Patent
Greiner et al.

(10) Patent No.: US 10,981,066 B2
(45) Date of Patent: Apr. 20, 2021

(54) VALUATION OF THIRD-PARTY GENERATED CONTENT WITHIN A VIDEO GAME ENVIRONMENT

(71) Applicant: Microsoft Technology Licensing, LLC, Redmond, WA (US)

(72) Inventors: Jared Benjamin Greiner, Seattle, WA (US); Kara Jane Kono, Bothell, WA (US); Lauren Elizabeth Careccia, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/558,051

(22) Filed: Aug. 31, 2019

(65) Prior Publication Data

US 2021/0060435 A1 Mar. 4, 2021

(51) Int. Cl.
*A63F 13/00* (2014.01)
*A63F 13/67* (2014.01)
*A63F 13/69* (2014.01)
*A63F 13/63* (2014.01)

(52) U.S. Cl.
CPC .............. *A63F 13/67* (2014.09); *A63F 13/63* (2014.09); *A63F 13/69* (2014.09)

(58) Field of Classification Search
None
See application file for complete search history.

(56) References Cited

U.S. PATENT DOCUMENTS

| | | | |
|---|---|---|---|
| 7,070,500 B1 * | 7/2006 | Nomi ................ | A63F 13/10 463/7 |
| 9,333,426 B1 * | 5/2016 | Bachman .......... | A63F 13/35 |
| 10,721,705 B1 * | 7/2020 | Kerr .................. | H04W 64/00 |
| 2009/0048860 A1 | 2/2009 | Brotman et al. | |
| 2009/0132435 A1 * | 5/2009 | Titus ................ | G06Q 10/10 705/400 |

(Continued)

OTHER PUBLICATIONS

"NFTs: Redefining the Meaning of Value through User-Generated Content in the Sandbox", Retrieved from: https://web.archive.org/web/20190514194635/https://medium.com/sandbox-game/nfts-redefining-the-meaning-of-value-through-user-generated-content-in-the-sandbox-f1a65f73b06, May 14, 2019, 5 Pages.

(Continued)

*Primary Examiner* — Paul A D'Agostino
(74) *Attorney, Agent, or Firm* — Rainier Patents, P.S.

(57) ABSTRACT

Described herein is a system and method for valuing third-party generated content within a video game environment. Third-party generated content (e.g., a persona item for a virtual character) for a video game comprising file(s) is received. The file(s) are analyzed to detect more predefined objective property(ies) of the received third-party generated content. A rarity score for the third-party generated content is calculated based, at least in part, upon the detected one or more predefined objective properties and, optionally, a weight assigned to each predefined objective property. A rarity level for the third-party generated content is assigned based, at least in part, on the calculated score. Information regarding the assigned rarity level of the third-party generated content is provided (e.g., to a user of the video game and/or a creator of the third-party generated content).

20 Claims, 5 Drawing Sheets

(56) References Cited

U.S. PATENT DOCUMENTS

| | | | |
|---|---|---|---|
| 2010/0017259 A1* | 1/2010 | Luo | G06Q 30/0603 |
| | | | 705/7.35 |
| 2011/0307304 A1 | 12/2011 | Mercuri | |
| 2013/0079142 A1* | 3/2013 | Kruglick | A63F 13/61 |
| | | | 463/40 |
| 2013/0317808 A1* | 11/2013 | Kruel | H04L 51/32 |
| | | | 704/9 |
| 2015/0121246 A1* | 4/2015 | Poore | G09B 7/00 |
| | | | 715/745 |
| 2016/0158648 A1* | 6/2016 | Adamson | A63F 13/63 |
| | | | 463/31 |
| 2016/0366483 A1* | 12/2016 | Joyce | A63F 13/85 |
| 2016/0371929 A1* | 12/2016 | Crow | G07F 17/3255 |
| 2017/0024120 A1 | 1/2017 | Shunock et al. | |
| 2017/0142168 A1 | 5/2017 | Nelson et al. | |
| 2017/0193847 A1* | 7/2017 | Ventrice | G06N 20/00 |
| 2017/0249311 A1 | 8/2017 | Pelleg et al. | |
| 2017/0279905 A1* | 9/2017 | Shah | G06Q 10/101 |
| 2017/0337164 A1* | 11/2017 | Longdale | H04L 67/18 |
| 2018/0293843 A1* | 10/2018 | Thornton | G06Q 20/3829 |
| 2019/0091575 A1* | 3/2019 | Reiche, III | A63F 13/795 |
| 2019/0192977 A1* | 6/2019 | Eatedali | A63F 13/69 |
| 2019/0299108 A1* | 10/2019 | Andall | A63F 13/31 |
| 2020/0196011 A1* | 6/2020 | Wyatte | A63F 13/79 |

OTHER PUBLICATIONS

"Top 10 Lists: The Top 10 Implementations of User-Generated Content", Retrieved from: https://gamefaqs.gamespot.com/top10/2398-the-top-10-implementations-of-user-generated-content, Jan. 30, 2012, 7 Pages.

Kasapakis, et al., "User-Generated Content in Pervasive Games", In Journal of Computers in Entertainment, vol. 16, Issue 1, Dec. 23, 2017, 23 Pages.

Momeni, et al., "How to Assess and Rank User-Generated Content on Web?", In Proceedings of International Conference on Companion of the Web, Apr. 23, 2018, pp. 489-493.

"International Search Report and Written Opinion Issued in PCT Application No. PCT/US2020/037832", dated Aug. 27, 2020, 10 Pages.

* cited by examiner

VALUATION OF THIRD-PARTY GENERATED CONTENT WITHIN A VIDEO GAME ENVIRONMENT

BACKGROUND

User(s) often interact within a video game using a virtual character. Many video games allow third-parties to generate content for user(s) to obtain (e.g., purchase or earn) in order to personalize the user's virtual character and/or the user's experience within the video game environment.

SUMMARY

Described herein is a system for valuing third-party generated content within a video game environment, comprising: a computer comprising a processor and a memory having computer-executable instructions stored thereupon which, when executed by the processor, cause the computer to: receive third-party generated content for a video game, wherein the third-party generated content comprises one or more files; analyze the one or more files to detect one or more predefined objective properties of the received third-party generated content; calculate a rarity score for the third-party generated content based, at least in part, upon the detected one or more predefined objective properties; assign a rarity level for the third-party generated content based, at least in part, on the calculated rarity score; and provide information regarding the assigned rarity level of the third-party generated content.

Also described herein is a method for valuing third-party generated content within a video game environment, comprising: receiving third-party generated content for a video game, wherein the third-party generated content comprises one or more files; analyzing the one or more files to detect one or more predefined objective properties of the received third-party generated content; calculating a rarity score for the third-party generated content based, at least in part, upon the detected one or more predefined objective properties and a weight assigned to each predefined objective property; assigning a rarity level for the third-party generated content based, at least in part, on the calculated rarity score; and providing information regarding the assigned rarity level of the third-party generated content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
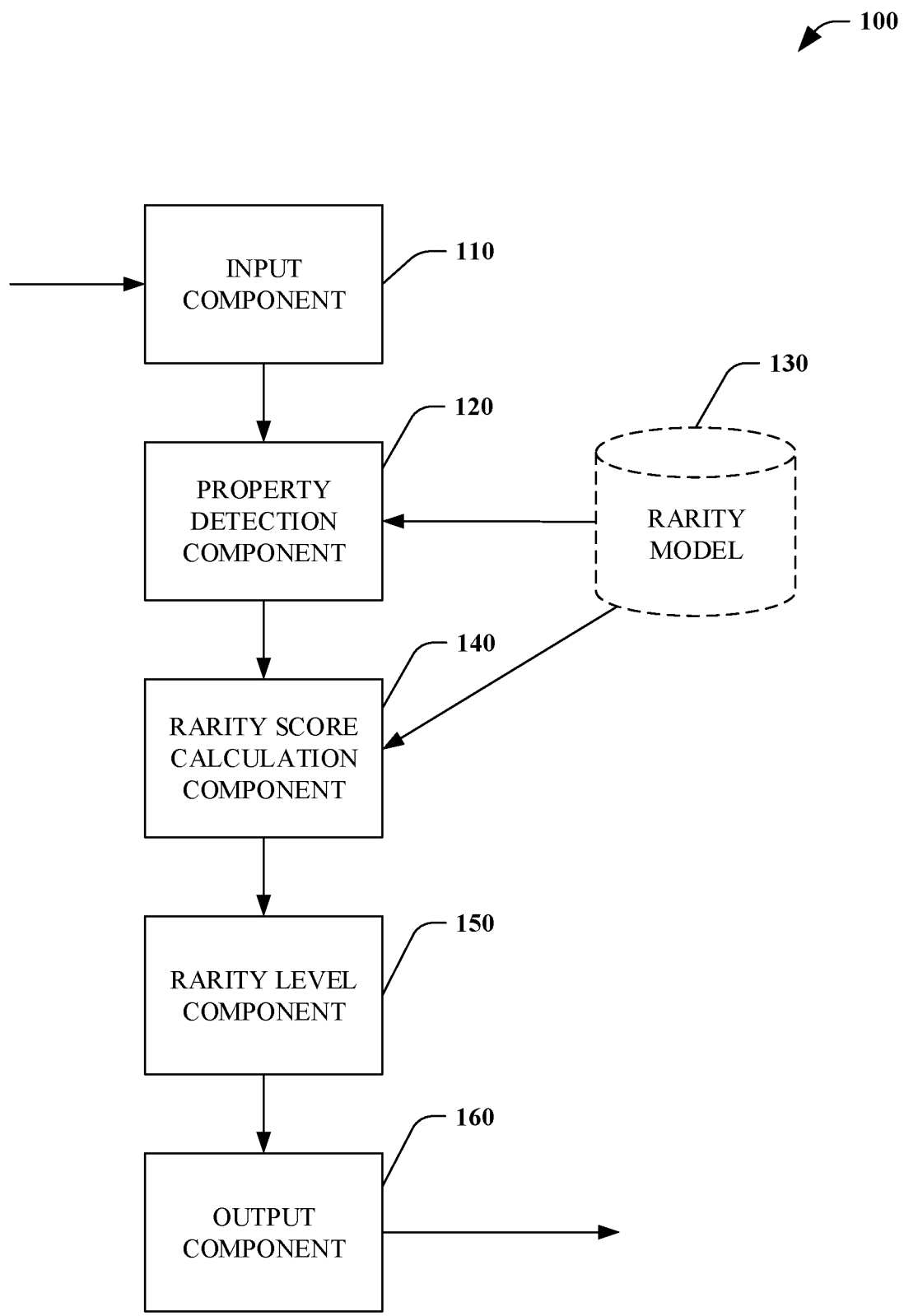
FIG. 1 is a functional block diagram that illustrates a system for valuation of third-party generated content within a video game based upon objective properties.

Various technologies pertaining to valuation of third-party generated content within a video game based upon objective properties are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding valuation of third-party generated content within a video game based upon objective properties. What follows are one or more exemplary systems and methods.

Aspects of the subject disclosure pertain to the technical problem of consistently valuing third-party generated content within a video game. The technical features associated with addressing this problem involve receiving third-party generated content for a video game, wherein the third-party generated content comprises one or more files; analyzing the one or more files to detect one or more predefined objective properties of the received third-party generated content; calculating a rarity score for the third-party generated content based, at least in part, upon the detected one or more predefined objective properties and a weight assigned to each predefined objective property; assigning a rarity level for the third-party generated content based, at least in part, on the calculated rarity score; and providing information regarding the assigned rarity level of the third-party generated content. Accordingly, aspects of these technical features exhibit technical effects of more efficiently, effectively, and/or consistently valuing third-party generated content with a video game thus saving computing resource(s) and/or bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Described herein is a system and method for valuation of third-party generated content within a video game based upon objective properties. Received third-party generated content (e.g., one or more files) are analyzed to detect predefined objective properties (e.g., the file type, whether the item overrides standard geometry, uses an animated textures, includes a glow layer to the texture, how long the animations play, etc.) A rarity score is calculated for the third-party generated content based upon the detected predefined objective properties. Using the calculated rarity score, the third-party-generated content is then assigned a rarity level, with each rarity level defined by a predefined range of rarity scores. Information regarding the assigned rarity level can then be provided, for example, to a developer of the third-party content, and/or to an end user of the video game.

Referring to FIG. 1, a system for valuation of third-party generated content within a video game based upon objective properties 100 is illustrated. In some embodiments, the system 100 is a component of a video game system (not shown). In some embodiments, the system 100 is physically and/or logically separate from the video game with calculations performed by the system 100 accessible to the video game, as discussed below.

In some embodiments, the video game comprises a computer-generated video game. For example, a user can utilize a virtual character to perform game play within the video game environment.

In some embodiments, the video game comprises an augmented reality (AR) video game in which real world images are displayed overlaid with a virtual experience (e.g., three-dimensional object(s)). An AR video game thus enables a participant to view real-world imagery in combination with context-relevant, computer-generated imagery (e.g., virtual object(s) such as virtual character(s)). Imagery from the real-world and the computer-generated are combined and presented to a user such that they appear to share the same physical space.

For purposes of explanation and not limitation, in some embodiments, the system 100 allows third-party creators to list third-party generated items (e.g., content) for sale in an AR video game (e.g., Minecraft®). These items can be created with software outside control of the video game. The system 100 can facilitate pricing these third-party generated items consistently for user(s) of the video game (e.g., consumer(s)) so that the user(s) do not experience wide pricing variations for substantially similar items.

The system 100 includes an input component 110 that receives third-party generated content comprising one or more files. For purposes of explanation and not limitation, the third-party generated content can comprise persona items (e.g., outfit, base body, clothing, armor, equipment, emotes) for a virtual character of the video game.

The system 100 further includes a property detection component 120 that analyzes the file(s) to detect one or more predefined objective properties of the received third-party generated content. In some embodiments, the property detection component 120 can detect one or more of the following properties: file type, item type, animated texture (full), animated texture (partial), attached emote, custom color, costume, elaborate animation, embellished, emoji, glow (full), glow (partial), group, IP (generic), IP (specific), length (long), length (short), looping, multiple materials, music, outline change, particle effect (full), particle effect (partial), pose, print, prop, random, silhouette change, simple, sound effect, state change, themed, translucence (full), translucence (partial), trend, and/or upper body only. In some embodiments, the property detection component 120 utilizes a rarity model 130 that stores information regarding the objective properties to be detected.

In some embodiments, the objective properties used to calculate the rarity score are predefined based upon the particular video game. For example, a first video game can utilize customer color and translucence as the predefined objective properties, while a second different video game can utilize sound effect and length as the predefined objective properties.

Once the objective predefined properties of the received third-party generated content have been detected, a rarity score calculation component 140 calculates a rarity score for the third-party generated content based, at least in part, upon the detected one or more predefined objective properties. In some embodiments, one or more of the predefined properties are assigned a weight (e.g., multiplier) which can be used by the rarity score calculation component 140 in calculating the rarity score for the third-party generated content. For example, a first predefined objective property can be deemed more significant than a second predefined objective property. In some embodiments, a weight of zero is indicative of the predefined objective property having no influence on the calculated rarity score.

In some embodiments, the assigned weight can be based, at least in part, upon a type of the persona item (e.g., outfit, base body, clothing, armor, equipment, emotes) and/or a sub-type of the persona item. For example, a persona item of type "outfit" can be subtyped into "limb replacement", "head", "face accessory", "outerwear", "top", "bottom", "hands", "feet", and/or "back". In some embodiments, information regarding the weights is stored in the rarity model 130.

The system 100 further includes a rarity level component 150 that assigns a rarity level for the third-party generated content based, at least in part, on the calculated rarity score. The rarity level assigned can provide an indication of quality and/or price tier to a developer and/or a consumer of the third-party generated content. The rarity level can be selected from a plurality of predefined rarity levels with each predefined rarity level encompassing a range of rarity scores. For example, third-party generated content having a calculated rarity score of: (1) less than a first threshold can be assigned "common"; (2) less than a second threshold can be assigned "uncommon"; (3) less than a third threshold can be assigned "rare"; (4) less than a fourth threshold can be assigned "epic"; and, (5) greater than or equal to the fourth threshold can be assigned "legendary".

The system 100 further includes an output component 160 that provides information regarding the assigned rarity level of the third-party generated content. In some embodiments, the information is provided to a creator of the third-party generated content, for example, via a graphical user interface (GUI) as part of the submission process. The information can allow the creator to determine whether or not to complete the submission and listing for sale of the third-party generated content. The information can include, for example, the assigned rarity level, the calculated rarity score, and/or the detected predefined objective properties. In this manner, the creator of the third-party generated content can understand how the assigned rarity level was determined, allowing for the opportunity to modify the third-party generated content to achieve a different assigned rarity level, if desired.

In some embodiments, the predefined objective properties and/or weights can be changed (e.g., dynamically) by an organization owning the video game, for example, responsive to shifts in consumer preferences.

In some embodiments, the systems and methods described herein can provide a significant improvement over manual review of submitted third-party generated content in both time savings and consistency as subjectivity is removed from assigned of the rarity level. In some embodiments, the systems and methods described herein can further reduce service infrastructure required for crowd sourced rarity level assignment, for example, relate to voting and/or malicious behavior by groups of voters.

Figure 2:
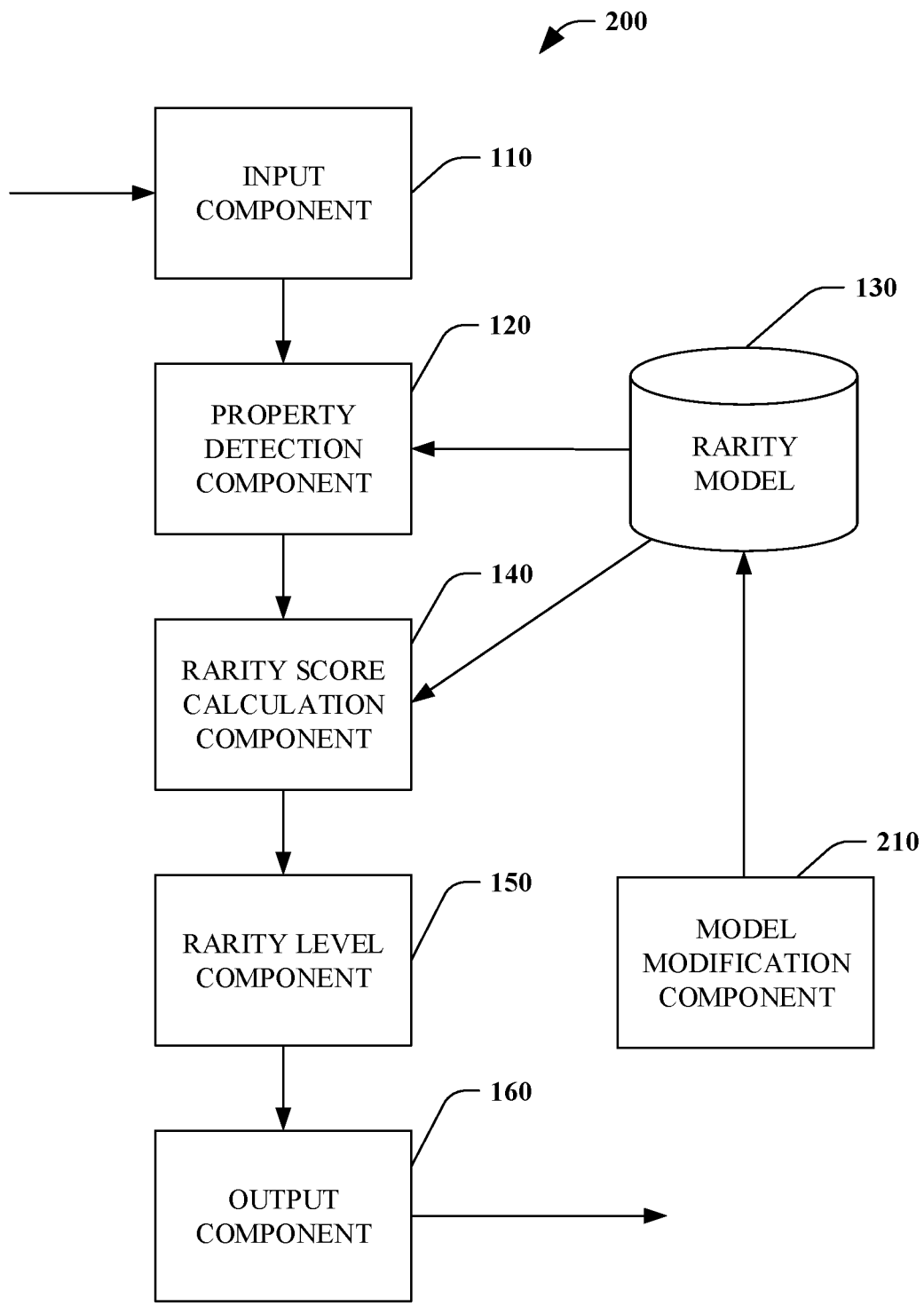
FIG. 2 is a functional block diagram that illustrates a system for valuation of third-party generated content within a video game based upon objective properties.

Turning to FIG. 2, a system for valuation of third-party generated content within a video game based upon objective properties 200 is illustrated. In some embodiments, the system 200 is a component of a video game system (not shown). In some embodiments, the system 200 is physically and/or logically separate from the video game with calculations performed by the system 200 accessible to the video game, as discussed below.

The system 200 includes the input component 110, the property detection component 120, the rarity model 130, the rarity score calculation component 140, the rarity level component 150, and the output component 160, as discussed above. The system 200 further includes a model modification component 210 that modifies predefined objective properties and/or weights assigned to particular predefined objective property(ies), for example, stored in the rarity model 130.

In some embodiments, the predefined objective properties and/or weights assigned to particular predefined objective property(ies) can be dynamically changed based, at least in part, upon user feedback. In some embodiments, the predefined objective properties and/or weights assigned to particular predefined objective property(ies) can be dynamically changed (e.g., manually by an organization that owns that video game), for example, responsive to determined shifts in consumer preference(s) and/or changes to the video game (e.g., recognition of additional property(ies), retirement of certain property(ies)).

In some embodiments, the predefined objective properties and/or weights assigned to particular predefined objective property(ies) can be dynamically changed automatically using a machine learning algorithm. For example, as the market and/or video game changes (e.g., with shifting consumer preferences), the predefined objective properties and/or weights assigned to particular predefined objective property(ies) can be adjusted (e.g., finely tuned rarity calculation and/or rarity level assignment).

Figure 3:
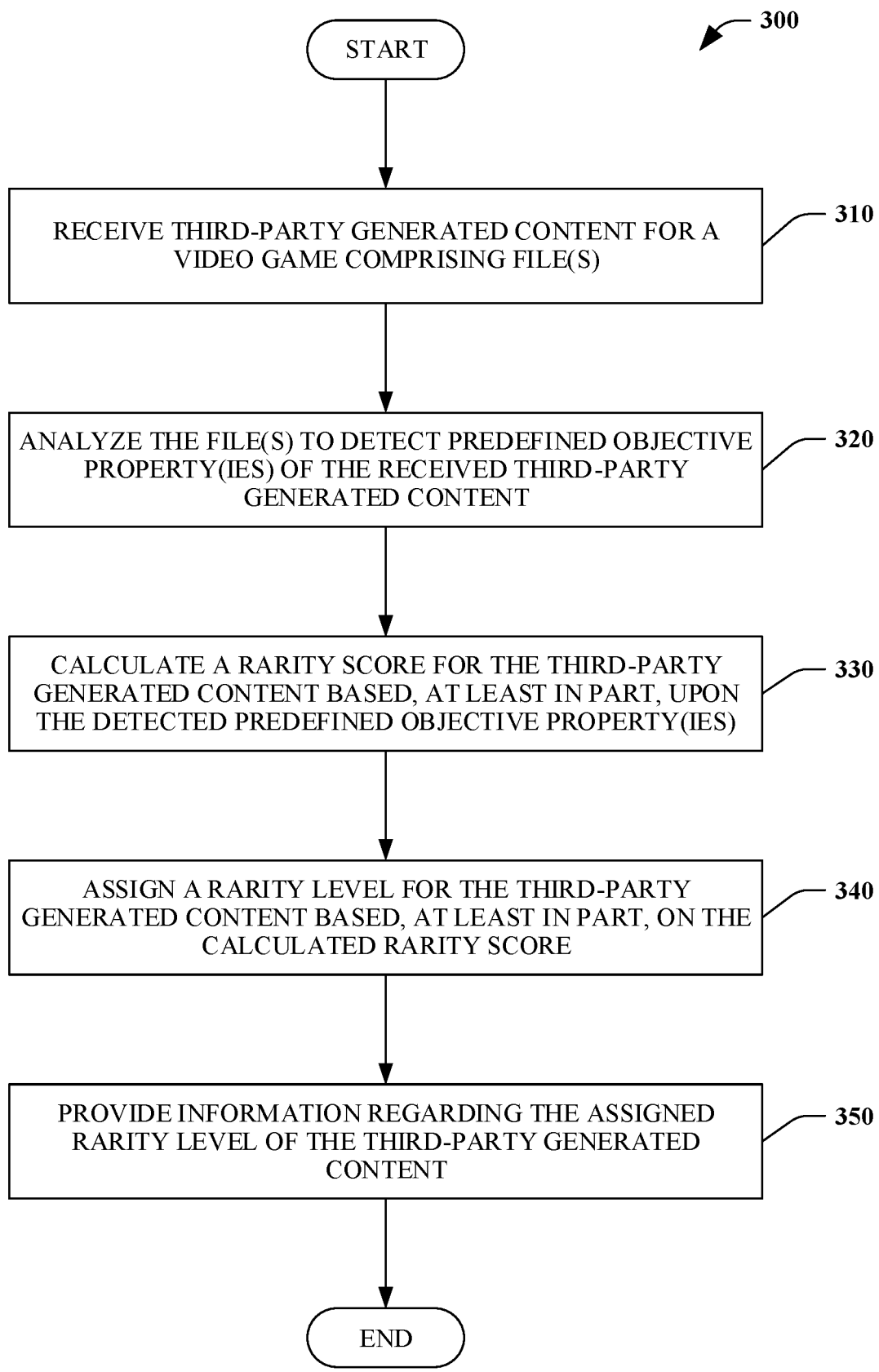
FIG. 3 is a flow chart that illustrates a method for valuing third-party generated content within a video game environment.
Figure 4:
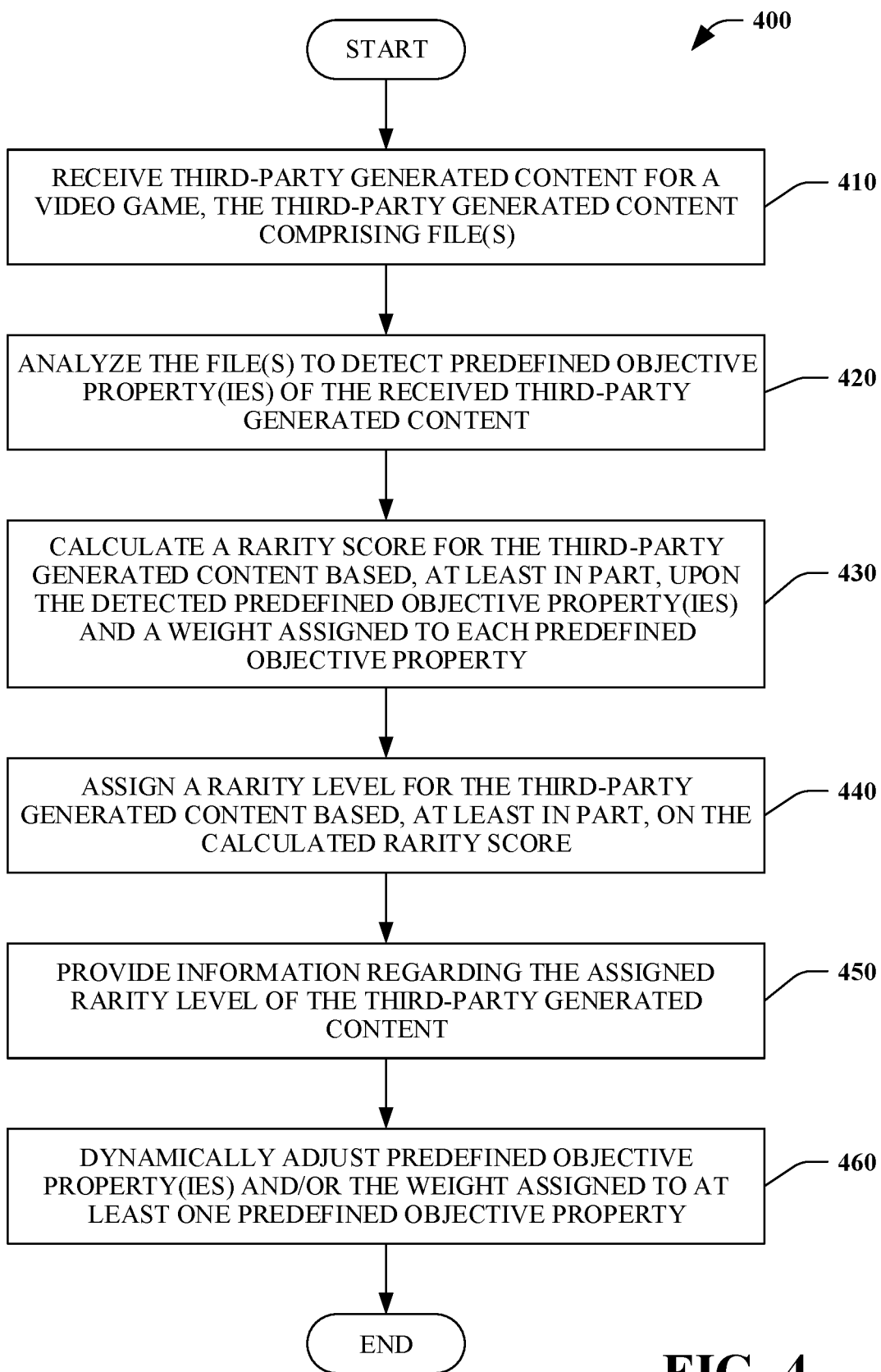
FIG. 4 is a flow chart that illustrates a method for valuing third-party generated content within a video game environment.

FIGS. 3 and 4 illustrate exemplary methodologies relating to valuation of third-party generated content within a video game based upon objective properties. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 3, a method for valuing third-party generated content within a video game environment 300 is illustrated. In some embodiments, the method 300 is performed by the system 100.

At 310, third-party generated content comprising one or more files is received. At 320, the one or more files are analyzed to detect one or more predefined objective properties of the received third-party generated content. At 330, a rarity score for the third-party generated content is calculated based, at least in part, upon the detected one or more predefined objective properties.

At 340, a rarity level for the third-party generated content is assigned based, at least in part, on the calculated score. At 350, information regarding the assigned rarity level of the third-party generated content is provided (e.g., to the content creator and/or a user of the video game). For example, the information can be provided to a user of the video game when viewing third-party generated content for sale within a video game environment.

Turning to FIG. 4, a method for valuing third-party generated content within a video game environment 400 is illustrated. In some embodiments, the method 400 is performed by the system 100.

At 410, third-party generated content comprising one or more files is received. At 420, the one or more files are analyzed to detect one or more predefined objective properties of the received third-party generated content/

At 430, a rarity score for the third-party generated content is calculated based, at least in part, upon the detected one or more predefined objective properties and a weight assigned to each predefined objective property. At 440, a rarity level for the third-party generated content is assigned based, at least in part, on the calculated score.

At 450, information regarding the assigned rarity level of the third-party generated content is provided. At 460, at least one of the one or more predefined object properties and/or the weight assigned to at least one predefined objective property is dynamically adjusted.

Described herein is a system for valuing third-party generated content within a video game environment, comprising: a computer comprising a processor and a memory having computer-executable instructions stored thereupon which, when executed by the processor, cause the computer to: receive third-party generated content for a video game, wherein the third-party generated content comprises one or more files; analyze the one or more files to detect one or more predefined objective properties of the received third-party generated content; calculate a rarity score for the third-party generated content based, at least in part, upon the detected one or more predefined objective properties; assign a rarity level for the third-party generated content based, at least in part, on the calculated rarity score; and provide information regarding the assigned rarity level of the third-party generated content.

The system can further include wherein calculation of the rarity score for the third-party generated content is further based, at least in part, a weight assigned to each predefined objective property. The system can include the memory having further computer-executable instructions stored thereupon which, when executed by the processor, cause the computer to: dynamically adjust at least one of the one or more predefined object properties or the weight assigned to at least one predefined objective property based, at least in part, upon user feedback. The system can include the memory having further computer-executable instructions stored thereupon which, when executed by the processor, cause the computer to: dynamically adjust at least one of the one or more predefined object properties or the weight assigned to at least one predefined objective property based, at least in part, a determined shift in consumer preference.

The system can include the memory having further computer-executable instructions stored thereupon which, when executed by the processor, cause the computer to: dynamically adjust at least one of the one or more predefined object properties or the weight assigned to at least one predefined objective property based, at least in part, a change to the video game. The system can further include wherein calculating the rarity score for the third-party generated content is based, at least in part, upon a rarity model that stores information regarding the weights assigned to each predefined objective property. The system can further include wherein analyzing the one or more files to detect the one or more predefined objective properties of the received third-party generated content is based, at least in part, upon a rarity model that stores information regarding the predefined objective properties to be detected.

The system can further include wherein the information regarding the assigned rarity level of the third-party generated content is provided to a user of the video game when viewing third-party generated content for sale within the video game environment. The system can further include wherein the information regarding the assigned rarity level of the third-party generated content is provided to creator of the third-party generated content during submission of the third-party generated content to the video game environment. The system can further include wherein the information regarding the assigned rarity level of the third-party generated content comprises the assigned rarity level and the calculated rarity score.

Described herein is a method for valuing third-party generated content within a video game environment, comprising: receiving third-party generated content for a video game, wherein the third-party generated content comprises one or more files; analyzing the one or more files to detect one or more predefined objective properties of the received third-party generated content; calculating a rarity score for the third-party generated content based, at least in part, upon the detected one or more predefined objective properties and a weight assigned to each predefined objective property; assigning a rarity level for the third-party generated content based, at least in part, on the calculated rarity score; and providing information regarding the assigned rarity level of the third-party generated content.

The method can further include dynamically adjusting at least one of the one or more predefined object properties or the weight assigned to at least one predefined objective property based, at least in part, upon user feedback. The method can further include dynamically adjusting at least one of the one or more predefined object properties or the weight assigned to at least one predefined objective property based, at least in part, a determined shift in consumer preference. The method can further include dynamically adjusting at least one of the one or more predefined object properties or the weight assigned to at least one predefined objective property based, at least in part, a change to the video game. The method can further include wherein calculating the rarity score for the third-party generated content is based, at least in part, upon a rarity model that stores information regarding the weights assigned to each predefined objective property.

Described herein is a computer storage media storing computer-readable instructions that when executed cause a computing device to: receive third-party generated content for a video game, wherein the third-party generated content comprises one or more files; analyze the one or more files to detect one or more predefined objective properties of the received third-party generated content; calculate a rarity score for the third-party generated content based, at least in part, upon the detected one or more predefined objective properties; assign a rarity level for the third-party generated content based, at least in part, on the calculated rarity score; and provide information regarding the assigned rarity level of the third-party generated content.

The computer storage media can further include wherein calculation of the rarity score for the third-party generated content is further based, at least in part, a weight assigned to each predefined objective property. The computer storage media can store further computer-readable instructions that when executed cause a computing device to: dynamically adjust at least one of the one or more predefined object properties or the weight assigned to at least one predefined objective property based, at least in part, at least one of upon user feedback, a determined shift in consumer preference, or a change to the video game. The computer storage media can further include wherein the information regarding the assigned rarity level of the third-party generated content is provided to a user of the video game when viewing third-party generated content for sale within the video game environment. The computer storage media can further include wherein the information regarding the assigned rarity level of the third-party generated content is provided to creator of the third-party generated content during submission of the third-party generated content to the video game environment.

Figure 5:
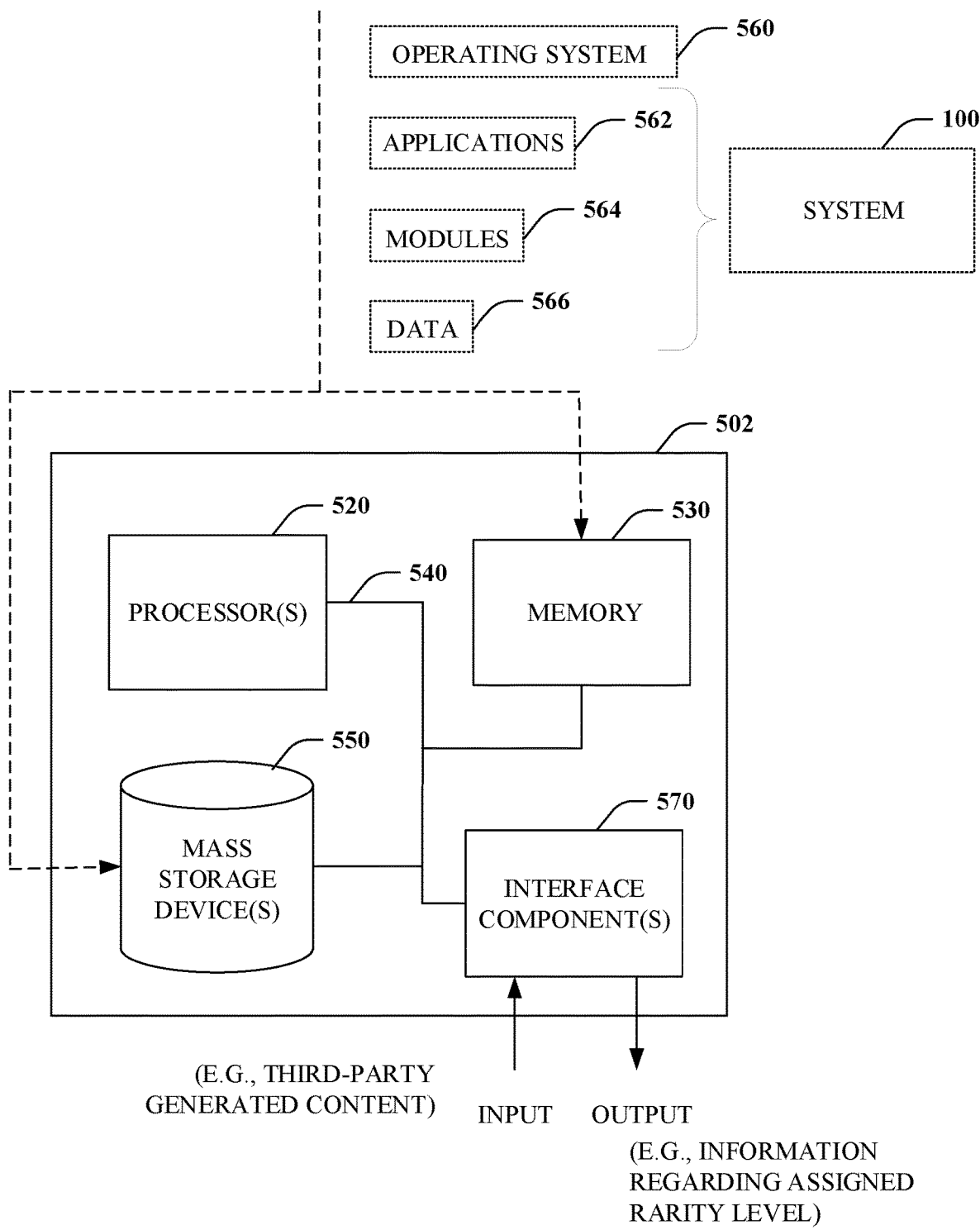
FIG. 5 is a functional block diagram that illustrates an exemplary computing system.

With reference to FIG. 5, illustrated is an example general-purpose computer or computing device 502 (e.g., mobile phone, desktop, laptop, tablet, watch, server, handheld, programmable consumer or industrial electronics, set-top box, game system, compute node, etc.). For instance, the computing device 502 may be used in a system for valuation of third-party generated content within a video game based upon objective properties 100.

The computer 502 includes one or more processor(s) 520, memory 530, system bus 540, mass storage device(s) 550, and one or more interface components 570. The system bus 540 communicatively couples at least the above system constituents. However, it is to be appreciated that in its simplest form the computer 502 can include one or more processors 520 coupled to memory 530 that execute various computer executable actions, instructions, and or components stored in memory 530. The instructions may be, for instance, instructions for implementing functionality described as being carried out by one or more components discussed above or instructions for implementing one or more of the methods described above.

The processor(s) 520 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 520 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 520 can be a graphics processor.

The computer 502 can include or otherwise interact with a variety of computer-readable media to facilitate control of the computer 502 to implement one or more aspects of the claimed subject matter. The computer-readable media can be any available media that can be accessed by the computer 502 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 502. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 530 and mass storage device(s) 550 are examples of computer-readable storage media. Depending on the exact configuration and type of computing device, memory 530 may be volatile (e.g., RAM), non-volatile (e.g., ROM, flash memory, etc.) or some combination of the two. By way of example, the basic input/output system (BIOS), including basic routines to transfer information between elements within the computer 502, such as during start-up, can be stored in nonvolatile memory, while volatile memory can act as external cache memory to facilitate processing by the processor(s) 520, among other things.

Mass storage device(s) 550 includes removable/non-removable, volatile/non-volatile computer storage media for storage of large amounts of data relative to the memory 530. For example, mass storage device(s) 550 includes, but is not limited to, one or more devices such as a magnetic or optical disk drive, floppy disk drive, flash memory, solid-state drive, or memory stick.

Memory 530 and mass storage device(s) 550 can include, or have stored therein, operating system 560, one or more applications 562, one or more program modules 564, and data 566. The operating system 560 acts to control and allocate resources of the computer 502. Applications 562 include one or both of system and application software and can exploit management of resources by the operating system 560 through program modules 564 and data 566 stored in memory 530 and/or mass storage device (s) 550 to perform one or more actions. Accordingly, applications 562 can turn a general-purpose computer 502 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 562, and include one or more modules 564 and data 566 stored in memory and/or mass storage device(s) 550 whose functionality can be realized when executed by one or more processor(s) 520.

In some embodiments, the processor(s) 520 can correspond to a system on a chip (SOC) or like architecture including, or in other words integrating, both hardware and software on a single integrated circuit substrate. Here, the processor(s) 520 can include one or more processors as well as memory at least similar to processor(s) 520 and memory 530, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 502 also includes one or more interface components 570 that are communicatively coupled to the system bus 540 and facilitate interaction with the computer 502. By way of example, the interface component 570 can be a port (e.g. serial, parallel, PCMCIA, USB, FireWire, etc.) or an interface card (e.g., sound, video, etc.) or the like. In one example implementation, the interface component 570 can be embodied as a user input/output interface to enable a user to enter commands and information into the computer 502, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 570 can be embodied as an output peripheral interface to supply output to displays (e.g., LCD, LED, plasma, etc.), speakers, printers, and/or other computers, among other things. Still further yet, the interface component 570 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   a processor; and
   a memory having computer-executable instructions stored thereupon which, when executed by the processor, cause the system to:
   receive a third-party generated virtual item for a video game, wherein the third-party generated virtual item is provided via one or more files generated using software that is external to the video game and the third-party generated virtual item is made available to players of the video game;
   analyze the one or more files to detect one or more predefined objective properties of the third-party generated virtual item;
   calculate a rarity score for the third-party generated virtual item based, at least in part, upon the one or more predefined objective properties and corresponding weights assigned to the one or more predefined objective properties;
   assign a rarity level for the third-party generated virtual item based, at least in part, on the calculated rarity score, the rarity level influencing one or more video game actions involving the third-party generated virtual item;
   provide information regarding the assigned rarity level of the third-party generated virtual item; and
   adjust the weights responsive to changing consumer preferences in the video game as users purchase other virtual items having other predefined objective properties, the adjusted weights being used to calculate further rarity scores that apply to further video game actions involving further third-party generated virtual items.

2. The system of claim 1, wherein an individual predefined objective property relates to a graphical characteristic of the third-party generated virtual item.

3. The system of claim 1, the memory having further computer-executable instructions stored thereupon which, when executed by the processor, cause the computer to:
   dynamically adjust at least one of the one or more predefined objective properties of the third-party generated virtual item based, at least in part, upon user feedback.

4. The system of claim 1, the memory having further computer-executable instructions stored thereupon which, when executed by the processor, cause the computer to:
   dynamically adjust at least one of the one or more predefined objective properties of the third-party generated virtual item based, at least in part, on the changing consumer preferences.

5. The system of claim 1, the memory having further computer-executable instructions stored thereupon which, when executed by the processor, cause the computer to:
   dynamically adjust at least one of the one or more predefined objective properties of the third-party generated virtual item based, at least in part, on a change to the video game.

6. The system of claim 1, wherein calculating the rarity score for the third-party generated virtual item is based, at least in part, upon a rarity model.

7. The system of claim 6, wherein the rarity model is a machine learning model.

8. The system of claim 1, wherein the information regarding the assigned rarity level of the third-party generated virtual item is provided to a user of the video game when viewing the third-party generated virtual item for sale within the video game.

9. The system of claim 1, wherein the information regarding the assigned rarity level of the third-party generated virtual item is provided to a creator of the third-party generated virtual item during submission of the third-party generated virtual item to the video game.

10. The system of claim 9, wherein the information regarding the assigned rarity level of the third-party generated virtual item comprises the assigned rarity level and the calculated rarity score.

11. A method, comprising:
    receiving a third-party generated virtual item for a video game, wherein the third-party generated content virtual item is provided via one or more files generated using software that is external to the video game and the third-party generated virtual item is made available to players of the video game;
    analyzing the one or more files to detect one or more predefined objective properties of the third-party generated virtual item;
    calculating a rarity score for the third-party generated virtual item based, at least in part, upon the predefined objective properties and corresponding weights assigned to the predefined objective properties;
    assigning a rarity level for the third-party generated virtual item based, at least in part, on the calculated rarity score, the rarity level influencing one or more video game actions involving the third-party generated virtual item;
    providing information regarding the assigned rarity level of the third-party generated virtual item; and
    adjusting the weights responsive to changing consumer preferences in the video game as users purchase other virtual items having other predefined objective properties, the adjusted weights being used to calculate further rarity scores that apply to further video game actions involving further third-party generated virtual items.

12. The method of claim 11, further comprising:
    dynamically adjusting an individual predefined objective property of the third-party generated virtual item based, at least in part, upon user feedback.

13. The method of claim 11, further comprising:
    dynamically adjusting an individual predefined objective property of the third-party generated virtual item based, at least in part, on the changing consumer preferences in the video game.

14. The method of claim 11, further comprising:
    dynamically adjusting an individual predefined objective property of the third-party generated virtual item based, at least in part, on a change to the video game.

15. The method of claim 11, wherein the weights are adjusted using a machine learning algorithm.

16. A computer storage media storing computer-readable instructions that, when executed, cause a computing device to:
    receive a third-party generated virtual item for a video game, wherein the third-party generated virtual item is provided via one or more files generated using software that is external to the video game and the third-party generated virtual item is made available to players of the video game;

analyze the one or more files to detect one or more predefined objective properties of the third-party generated virtual item;

calculate a rarity score for the third-party generated virtual item based, at least in part, upon the one or more predefined objective properties and one or more corresponding weights assigned to the one or more predefined objective properties;

assign a rarity level for the third-party generated virtual item based, at least in part, on the calculated rarity score, the rarity level influencing one or more video game actions involving the third-party generated virtual item;

provide information regarding the assigned rarity level of the third-party generated virtual item; and adjust the weights responsive to changing consumer preferences in the video game as users purchase other virtual items having other predefined objective properties, the adjusted weights being used to calculate further rarity scores that apply to further video game actions involving further third-party generated virtual items.

17. The computer storage media of claim 16, wherein the rarity level identifies a price tier for purchase transactions in the video game involving the third-party generated virtual item.

18. The computer storage media of claim 17, storing further computer-readable instructions, that when executed, cause the computing device to:

dynamically adjust an individual predefined objective property of the third-party generated virtual item based, at least in part, on at least one of upon user feedback or a change to the video game.

19. The computer storage media of claim 17, wherein the information regarding the assigned rarity level of the third-party generated virtual item is provided to a user of the video game when viewing the third-party generated virtual item for sale within the video game.

20. The computer storage media of claim 17, wherein the information regarding the assigned rarity level of the third-party generated virtual item is provided to creator of the third-party generated virtual item.

\* \* \* \* \*